United States Patent [19]

Kumpf et al.

[11] Patent Number: 5,618,889
[45] Date of Patent: Apr. 8, 1997

[54] POLY(ARYLETHER)/LIQUID CRYSTALLINE POLYESTER BLOCK COPOLYMERS AND A PROCESS FOR THEIR PRODUCTION

[75] Inventors: Robert J. Kumpf, Pittsburgh; Douglas A. Wicks, Mt. Lebanon, both of Pa.; Dittmar K. Nerger, Krefeld, Germany; Harald Pielartzik, Pittsburgh, Pa.; Rolf Wehrmann, Krefeld, Germany

[73] Assignee: Bayer Corporation, Pittsburgh, Pa.

[21] Appl. No.: 701,425

[22] Filed: May 15, 1991

[51] Int. Cl.$^6$ .................................................. C08G 81/00
[52] U.S. Cl. ......................... 525/437; 525/471; 525/535
[58] Field of Search ............................................. 525/437

[56] References Cited

U.S. PATENT DOCUMENTS

| | | | |
|---|---|---|---|
| 4,619,975 | 10/1986 | Matzner | 525/437 |
| 4,837,284 | 6/1989 | Matzner | 525/437 |

OTHER PUBLICATIONS

Advances in Polymer Science, vol. 59 Springer–Verlag, Heidelberg (1984) pp. 1–158.
ACS Symposium Series 435, Weiss et al, American Chemical Society (1990). Current Topics in Liquid Crystalline Polymer pp. 1–13.
Waehumad et al, Polymer Preprint 1989, pp. 252–253.
McGrath et al, Poly. Eng. Sci. vol. 17, p. 648 (1977).
Auman et al, Polymer, vol. 29, p. 938 (1988).

*Primary Examiner*—Patricia A. Short
*Attorney, Agent, or Firm*—Joseph C. Gil; Lyndanne M. Whalen

[57] ABSTRACT

Block copolymers represented by the formula

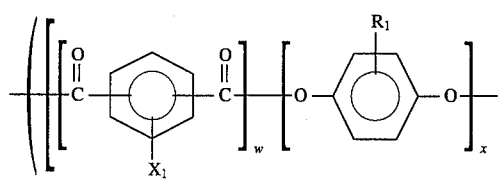

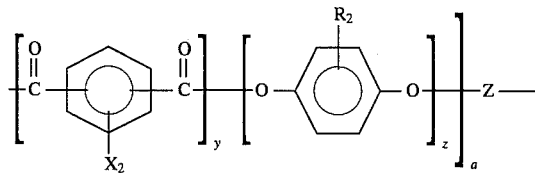

are formed by contacting an ester group containing poly(aryl ether ketone) composed of the recurring units

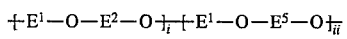

with a liquid crystalline polyester represented by the formula

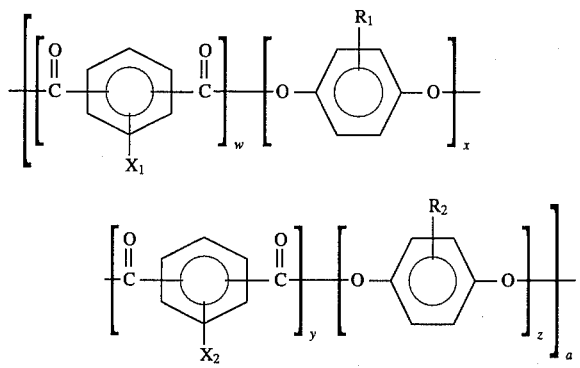

in which $R_1, R_2, X_2, X, Z, E^1, E^2, E^5$, w, x, y, z a, b and n each represent specified groups or values under conditions such that a transesterification reaction will occur.

12 Claims, 1 Drawing Sheet

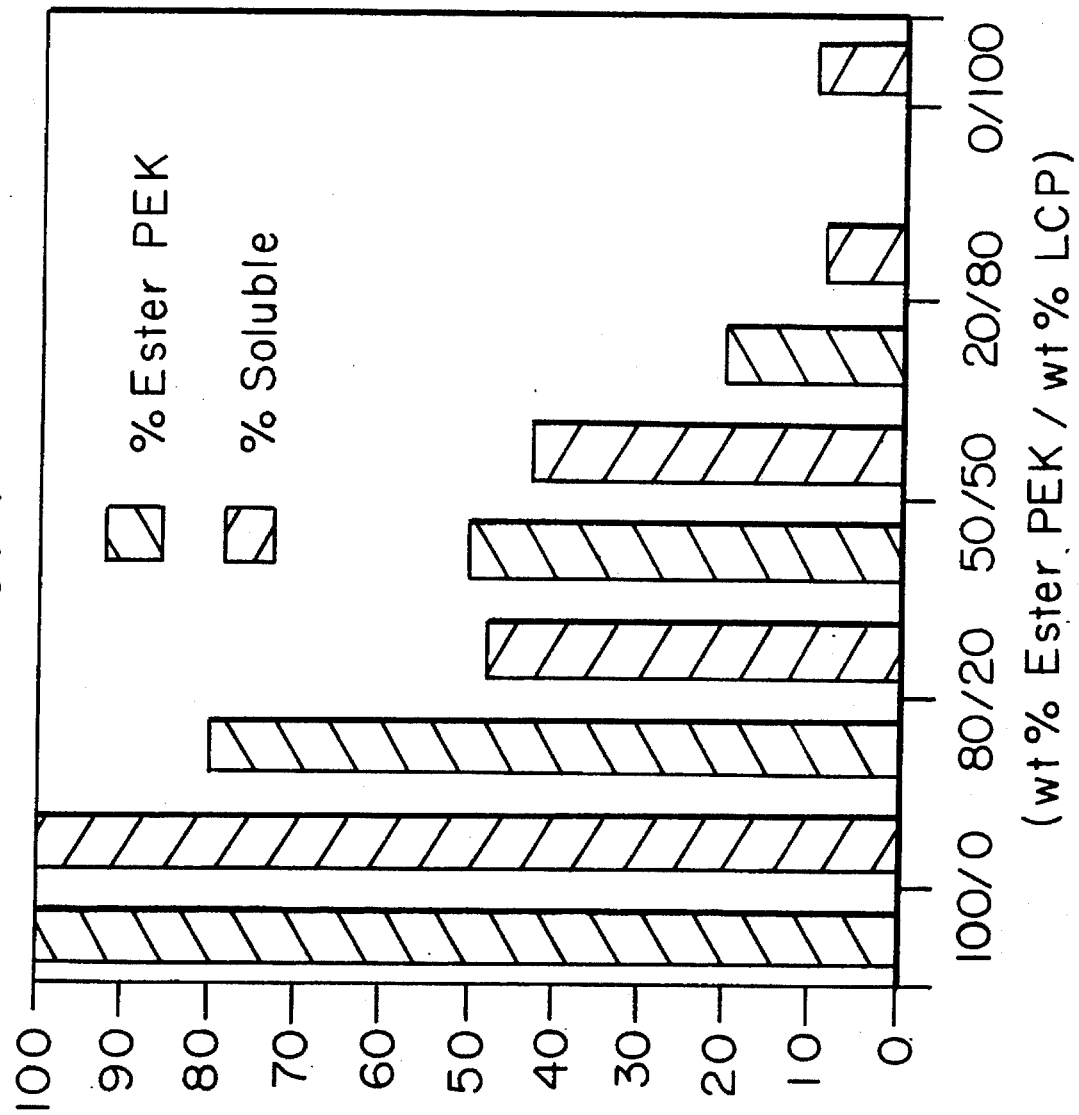

POLY(ARYLETHER)/LIQUID CRYSTALLINE POLYESTER BLOCK COPOLYMERS AND A PROCESS FOR THEIR PRODUCTION

BACKGROUND OF THE INVENTION

The present invention relates to poly(arylether)/liquid crystalline polyester block copolymers and to a process for their production.

Liquid crystalline polyesters form anisotropic melts and solutions which can be processed to form ultra high strength and ultra high modulus fibers, films, and molded articles. See, e.g., Advances in Polymer Science, Vol. 59, Springer-Verlag, Heidelberg (1984) and ACS Symposium Series 435, Weiss et al editors, American Chemical Society (1990). These materials could therefore be useful as reinforcing materials in polymer composites.

It is, however, difficult to prepare composite polymer materials with liquid crystalline polyesters because the liquid crystalline molecules aggregate and do not mix with the random coil matrix material. Block copolymers of liquid crystalline polymers have been prepared by coupling two telechelic oligomers or by polymerizing monomers in the presence of telechelic oligomers. See, e.g., Waehumad et al, Polymer Preprint 1989, pages 252–253 and McGrath et al Poly. Eng. Sci. Volume 17, page 648 (1977). It has been found, however, that such processes are not very effective because phase separation occurs and only a small amount of block copolymer forms. See, e.g., Auman et al, Polymer, Volume 29, page 938 (1988).

SUMMARY OF THE INVENTION

It is an object of the present invention to provide poly(aryletherketone)/liquid crystalline polyester block copolymers which have a predictable block length.

It is another object of the present invention to provide poly(aryletherketone)liquid crystalline polyester block copolymers which may be formed in an extruder.

It is also an object of the present invention to provide a process for producing a poly(aryletherketone)/liquid crystalline polyester block copolymer via transesterification of an ester-containing poly(aryletherketone) and a liquid crystalline polyester.

Another object of the present invention is to provide a process for producing poly(aryletherketone)/liquid crystalline polyester block copolymers which may be carried out in a relatively short period of time, It is also an object of the present invention to provide a process for producing poly(aryletherketone)/liquid crystalline polyester block copolymers in which no catalyst need be employed.

These and other objects which will be apparent to those skilled in the art are accomplished by copolymerizing an ester group containing poly(aryletherketone) with a liquid crystalline polyester. This copolymerization may be carried out in the presence of a solvent or it may be carried out by melt blending the ester-containing poly(aryletherketone) and the liquid crystalline polyester.

BRIEF DESCRIPTION OF THE DRAWING

FIG. 1 graphically illustrates the results of the toluene extraction study described in Example 9.

DETAILED DESCRIPTION OF THE PREFERRED EMBODIMENTS OF THE INVENTION

The present invention relates to block copolymers represented by the formula

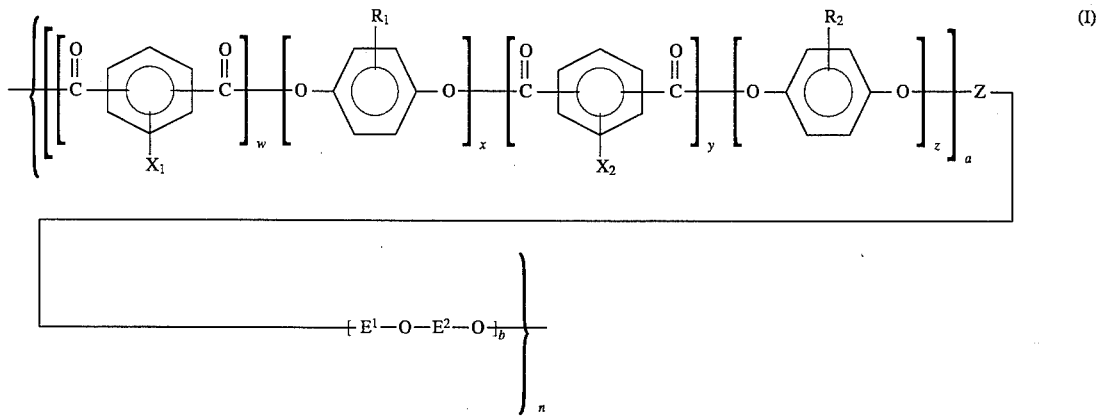

in which $R_1$ and $R_2$ each represents an alkyl group, aryl group, aralkyl group, alkoxy group, phenoxy group or a combination of these groups;

$X_1$ and $X_2$ each represents a hydrogen or halogen atom preferably chlorine;

w, x, y, z each represents a mole fraction of the monomer residuum such that $(w+y)=(x+z)$;

Z represents the linkage which results from the transesterification of a liquid crystalline polyester and an ester group containing aromatic polyether;

$E^1$ represents the residuum of a benzenoid compound having an electron withdrawing group in at least one of the positions ortho or para to the valence bonds having a sigma value sufficient to activate a halogen enough to promote reaction of the halogen with an alkali metal phenolate (appropriate sigma values generally<+0.7);

$E^2$ represents the residuum of a dihydric phenol which does not contain ester groups;

a represents the average number of repeated aryl ester units in the block copolymers;

b represents the average number of repeated aryl ether units in the block copolymers; and n represents the degree of polymerization of the block copolymers;

In the preferred block copolymers of the present invention, $R_1$ and $R_2$ each represent a t-butyl or phenyl group;

$X_1$ and $X_2$ each represent H or chlorine; and w represents a mole fraction of from 0.01 to 0.99, preferably about 0.20;

x represents a mole fraction of from 0.01 to 0.99, preferably about 0.50;

Y represents a mole fraction of from 0.01 to 0.99, preferably about 0.80;

Z represents a mole fraction of from 0.01 to 0.99, preferably about 0.50;

$E^1$ represents the residuum of a difluorobenzophenone or dichlorodiphenylsulfone;

$E^2$ represents the residuum of 3,2-bis-(4-hydroxyphenyl)-propane; and a represents an average number of from 2–200;

b represents an average number of from 2–200;

n represents the degree of polymerization of the block copolymer, preferably 2–50; and Z represents the linking group.

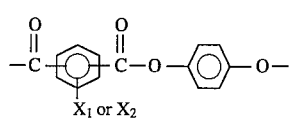

(IIa)

or

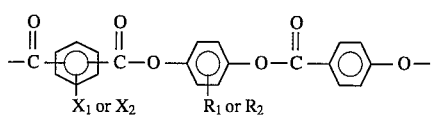

(IIb)

The block copolymers of the present invention are produced by reacting an ester group-containing poly(aryl ether ketone) represented by the formula

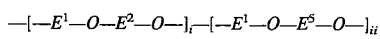

(III)

in which $E^1$ and $E^2$ are as defined above;

$E^5$ represents the residuum of an ester group containing bisphenol, preferably from 4'-hydroxyphenyl-4-hydroxy benzoate; and i and ii each represents an integer such that the sum of i plus ii totals 100, provided that ii is greater than 0, with a liquid crystalline polyester.

One process for producing the ester group containing aromatic polyether ketones employed to produce the block copolymers of the present invention is the reaction of aromatic dihalides with aromatic bisphenols which do not include ester groups and with aromatic bisphenols which do include an ester group. The aromatic dihalides useful in this process may be represented by the formula

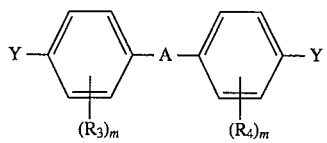

(IV)

in which

Y represents fluorine, chlorine or bromine, preferably, fluorine or chlorine;

$R_3$ and $R_4$ each represent a halogen atom, preferably fluorine, chlorine or bromine; hydrogen; a $C_1$–$C_4$ alkyl group, preferably, a methyl or ethyl group; a $C_6$–$C_{12}$ aryl group, preferably a phenyl or biphenyl group; or a $C_7$–$C_{12}$ aralkyl group, preferably a methlyphenyl or ethylphenyl group;

A represents $SO_2$, CO, SO or a group corresponding to the formula

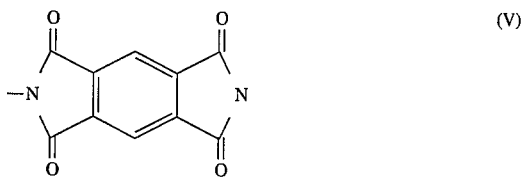

(V)

preferably, CO or $SO_2$ and m represents 0 or an integer of from 1 to 4, preferably, 0, 1 or 2.

Specific examples of suitable aromatic dihalogen compounds include: 4,4'-dichlorophenylsulphone, 4,4'-difluorodiphenylsulphone, 4,4'-difluorobenzophenone and 4,4'-dichlorobenzophenone.

The aromatic bisphenols which do not include an ester group useful in producing the ester group containing polyethers include those which are represented by the formula

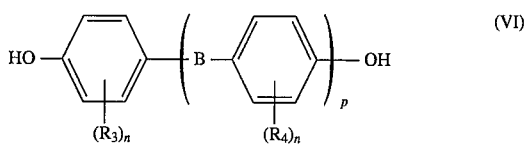

(VI)

in which $R_3$ and $R_4$ each represents a halogen atom, preferably fluorine, chlorine or bromine; hydrogen; a $C_1$–$C_4$ alkyl group, preferably, a methyl or ethyl group; a $C_6$–$C_{12}$ aryl group, preferably a phenyl or biphenyl group; or a $C_7$–$C_{12}$ aralkyl group, preferably a methylphenyl or ethylphenyl group;

B represents a chemical bond; CO; O; S; $SO_2$; $R_5$—C—$R_6$ or —C—$(W)_q$—$R_7R_8$ in which $R_5$ and $R_6$ each represents hydrogen or a $C_1$–$C_6$ alkyl group, preferably hydrogen or methyl;

W represents carbon;

q represents an integer of from 4 to 7, preferably 4 or 5; and $R_7$ and $R_8$ each represents hydrogen or a $C_1$–$C_6$ alkyl group, preferably hydrogen or a methyl group;

n has the same meaning as given above; and p represents 0 or an integer of from 1 to 3, preferably 0 or 1.

Specific examples of bisphenols which correspond to formula VI that are useful in the production of the ester group containing polyethers employed in the present invention include: hydroquinone, methylhydroquinone, phenylhydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α,α'-bis-(hydroxyphenyl)-diisopropylbenzenes. Preferred bisphenols include: 4,4'-dihydroxydiphenyl, 2,2-bis-(4-hydroxyphenyl)-propane, 2,4-bis-(4-hydroxyphenyl)-2-methylbutane, 1,1-bis-(4- hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)propane, 2,2-bis-(3,5-dibromo-4-hydroxyphenyl)-propane, 1,1-bis-(4-hydroxyphenyl)-cyclohexane, 4,4'-dihydroxy-diphenyl sulfone, 1,6-naphthaindole, 1,7-naphthaindole, 2,6-naphthaindole, 2,7-naphthaindole, 4,4'-dihydroxy-diphenylsulfone and 4,4'-dihydroxy-benzophenone.

The aromatic bisphenols containing an ester group which are useful in producing the ester group containing polyethers include those which are represented by the formula

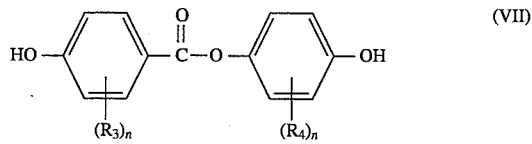

(VII)

in which

R$_3$ and R$_4$ each have the meanings given above and n has the same meaning as above.

Specific examples of such ester group containing bisphenols useful in producing ester group-containing polyethers include: 4-hydroxyphenyl-4-hydroxybenzoate and bis-(4'-hydroxybenzoyl)-1,4dihydroxybenzene.

The reaction in which the ester group containing polyether formed is generally carried out in the presence of a basic catalyst and in the presence of a dipolar, aprotic solvent. The basic catalyst is generally used in an amount of from about 1 to about 1.3 equivalents of catalyst per equivalent of total dihydroxy compound (i.e., total amount of bisphenol represented by formula VI plus bisphenol represented by formula VII). Suitable basic catalysts include alkali metal salts and alkaline earth metal salts. Specific examples of appropriate basic catalysts are sodium hydroxide, potassium hydroxide, sodium methanolate, potassium carbonate and potassium bicarbonate.

Suitable solvents include N-methylpyrrolidone, N-methylcaprolactam, dimethylsulfoxide, diphenylsulfone and sulfolan. These solvents are generally employed in an amount of from about 0.5 to about 50 parts by weight, preferably from about 2 to about 20 parts by weight based on the total weight of the reactants.

The ester group Containing polyethers are generally prepared by reacting the dihalide and bisphenols at temperatures of from about 130° to about 320° C., preferably from about 145° to about 280° C. for from about 1 to about 50 hours, preferably from about 2 to about 20 hours. The reaction may be carried out under pressures of from about 0.8 to about 10 bar but ambient pressure is preferred.

Suitable techniques for carrying out the polyether forming reaction are known.

The ester group containing polyethers prepared by this process or any other suitable technique are characterized by average molecular weights (as determined by gel permeation chromatography using polystyrene as the standard) of from about 560 to about 300,000, preferably from about 1000 to about 200,000 and most preferably from about 2000 to about 100,000.

The ester group containing polyethers may be reacted with any of the known liquid crystalline polyesters. Particularly preferred liquid crystalline polyesters are those obtained by polymerizing two or more substituted linear bisphenols or hydroquinones with substituted terephthalic or isophthalic acids under typical polymerization conditions. Specific examples of appropriate liquid crystalline polyesters include those represented by the formula

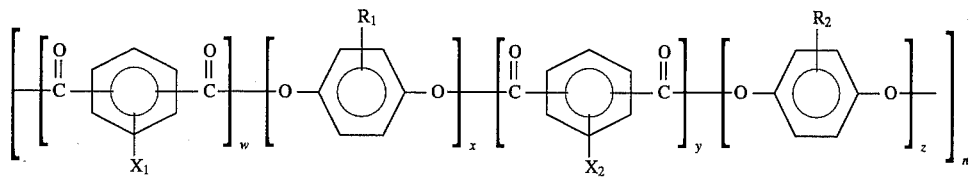

in which

R$_1$ and R$_2$ each represents an alkyl group, aryl group, aralkyl group, alkoxy group, phenoxy group or a combination of these groups;

X$_1$ and X$_2$ each represents a hydrogen or halogen atom preferably chlorine;

w, x, y, z each represents a mole fraction of the monomer residuum such that (w+y)=(x+z); and n represents the average degree of polymerization.

In the preferred liquid crystalline polyesters used to produce the block copolymers of the present invention, R$_1$ and R$_2$ each represents a t-butyl or phenyl group;

X$_1$ and X$_2$ each represents hydrogen or chlorine; and w, x, y, z each represent mole fractions of the monomer residuum between 0.01 and 0.99, preferably w=about 0.20, x=about 0.5, y=about 0.8, z=about 0.5.

The reaction of the liquid crystalline polyester with the ester group-containing polyether ketone can be carried out in the presence of a solvent, preferably a solvent having a boiling point below about 400° C. Suitable solvents include: chlorobenzene, dichlorobenzene, toluene. The solvent is generally used in an amount of at least 30% by weight, preferably 50% by weight.

A catalyst is not necessary in the process of the present invention, however, it would be possible to include a catalyst. Where used, the catalyst is generally employed in an amount of from about 0.1 to about 1.0 wt. %. Specific examples of suitable catalysts include: potassium acetate, sodium acetate, antimony trioxide and cobalt (II) acetate.

Other materials which may optionally be included in the reaction mixture are inert polyaryl ether homopolymers.

The process of the present invention may be carried out at temperatures of from about 110° C. to about 400° C., preferably, from about 150° to about 400°C. and most preferably from about 250° C. to about 270° C. The reaction may optionally be carried out under pressure. Suitable pressures include 10–300 psi (pounds per square inch).

The block copolymers of the present invention are characterized by being high temperature, high performance thermoplastic engineering polymers with a combination of good thermal and good mechanical properties. They may be microphase separated block copolymers in which case they will possess two glass transition temperatures (Tg's). They also may be homogeneous block copolymers in which case they will have a single Tg. In some cases the physical properties of the copolymers will be an average of the properties of the constituent homopolymers. In other cases however, synergistic behavior is observed and the physical properties of the block copolymers are superior to those of either homopolymer. These superior properties make them particularly useful as compatibilizing agents in polymer blends (See e.g., Olabisi, Robeson, and Shaw in "Polymer-Polymer Miscibility" Academic Press (1979).)

Having thus described our invention in detail, the following examples are given as being illustrative thereof. All parts and percentages given in these examples are parts by weight and percentages by weight, unless otherwise indicated.

EXAMPLE

Example 1

Synthesis of Ester-containing Poly(etherketone)

Difluorobenzophenone (21.82 g; 0.1 mol), bisphenol A (21.73 g; 0.0952 mol ), 4'-hydroxy phenyl-4-hydroxybenzoate (1.104 g; 0.0048 mol.), and $K_2CO_3$ (15.2 g; 0.11 mol) were combined with 100 ml of N-methyl-2-pyrolidinone (NMP) and 65 ml toluene in a 250 ml 3-neck flask (all glassware was previously flame dried). A mechanical stirrer, Dean-Stark trap (12 ml volume) with condenser and $N_2$ outlet and a Claisen adapter with $N_2$ inlet and thermocouple were attached and the entire system was purged with $N_2$ for 10 minutes. The solution was heated at 155° C. for 8 hours. During this time toluene and water collected in the Dean-Stark trap. After 8 hours, 20 ml of toluene and water were allowed to drain from the trap and the temperature was raised to 180° C. After 5 hours the toluene was drained and the temperature increased to 187° C. for 2 hours. During this time, the yellow/green solution became very viscous. The solution was cooled to room temperature, diluted with 100 ml NMP, then poured into a large excess of methanol to precipitate a fibrous white polymer which was collected and redissolved in methylene chloride. The methylene chloride solution was washed with 10% HCl and water. Methanol was then added to precipitate the polymer which was dried in vacuum at 80° C. for 8 hours. A yield of 97%–99% was obtained.

Polymer Characterization

Molecular weight as measured by gel permeation chromatography (GPC) (polystyrene standard)

$M_w$=28200

$M_n$=16500

$M_w/M_n$=1.71

Thermal properties as measured by differential scanning calorimetry (DSC): $T_g$=140° C.

Example 2

Synthesis of Ester-containing Poly (etherketone)

Difluorobenzophenone (21.82 g; 0.1 mol, bisphenol A (20.75 g; 0.0909 mol), 4'-hydroxy phenyl-4-hydroxybenzoate (2.093 g; 0.0091 mol.), and $K_2CO_3$ (15.2 g; 0.11 mol) were combined with 100 ml of NMP and 65 ml toluene in a 250 ml 3-neck flask (all glassware was previously flame dried). A mechanical stirrer, Dean-Stark trap (12 ml, volume) with condenser and $N_2$ outlet and a Claisen adapter with $N_2$ inlet and thermocouple were attached and the entire system was purged with $N_2$ for 10 minutes. The solution was heated at 155° C. for 8 hours. During this time, toluene and water collected in the Dean-Stark trap. After 8 hours, 20 ml of toluene and water were allowed to drain from the trap and the temperature was raised to 180° C. After 5 hours, the toluene was drained and the temperature increased to 187° C. for 2 hours. During this time, the yellow/green solution became very viscous. The solution was cooled to room temperature, diluted with 100 ml NMP and then poured into a large excess of methanol to precipitate a fibrous white polymer. The fibrous white polymer was collected and redissolved in methylene chloride. The methylene chloride solution was washed with 10% HCl, water, and then poured into methanol to precipitate the polymer which was dried in vacuum at 80° C. for 8 hours. A yield of 97%–99% was obtained.

Polymer Characterization

Molecular weight as measured by GPC (polystyrene standard)

$M_w$=34200

$M_n$=20400

$M_w/M_n$=1.7

Thermal properties as measured by DSC: $T_g$=153° C.

Example 3

Synthesis of Ester-containing Poly(ethersulfone)

Difluorodiphenylsulfone (25.43 g; 0.1 mole), hisphenol A (21.73 g; 0.0952 mol), 4'-hydroxy phenyl-4-hydroxybenzoate (1.104 g; 0.0048 mol), and $K_2CO_3$ (15.2 g; 0.11 mol) were combined with 100 ml of NMP and 65 ml toluene in a 250 ml 3-neck flask (all glassware was previously flame dried). A mechanical stirrer, Dean-Stark trap (12 ml volume) with condenser and $N_2$ outlet and a Claisen adapter with $N_2$ inlet and thermocouple were attached and the entire system was purged with $N_2$ for 10 minutes. The solution was heated at 155° C. for 8 hours. During this time, toluene and water collected in the Dean-Stark trap. After 8 hours, 20 ml of toluene and water were allowed to drain from the trap and the temperature was raised to 180° C. After 5 hours, the toluene was drained and the temperature increased to 187° C. for 2 hours. During this time, the yellow/green solution became very viscous. The solution was cooled to room temperature, diluted with 100 ml NMP and then poured into a large excess of methanol to precipitate a fibrous white polymer. The fibrous white polymer was collected and redissolved in methylene chloride. The methylene chloride solution was washed with 10% HCl and water and then poured into methanol to precipitate the polymer. The polymer was dried in a vacuum at 80° C. for 8 hours. A yield of 97%–99% was achieved.

Polymer Characterization

Molecular weight as measured by GPC (polystyrene standard)

$M_w$=55600

$M_w$25600

$M_w/M_n$=2.2

Thermal properties as measured by DSC: $T_{g=154°}$ C.

Example 4

Saponification of Ester-containing Poly (etherketone)

The ester-containing poly(etherketone) (2.0 g) described in Example 1 and potassium hydroxide (2 g) were dissolved in methanol (20 ml) and methylene chloride (60 ml). This mixture was stirred at room temperature for approximately 1 hour. The solution was carefully acidified with HCl until the pH was 6 and the volatile solvents were allowed to evaporate. The solid material was refluxed with 20 ml of acetic anhydride and 1 ml of pyridine for 30 min. The volatile liquid was again evaporated. The solid taken up into methylene chloride was again washed with water, dried over magnesium sulfate and then rotoevaporated to give an off-white solid. This solid was dried in vacuo at 100° C. for 6 hours. The molecular weight of the material was determined by GPC (polystyrene standard).

This procedure was repeated using 2 gram of a sample of the polymer prepared by the procedure described in Example 2 and using 2 grams of a poly(etherketone) homopolymer having no ester groups. The homopolymers containing no ester groups was prepared by combining difluorobenzophenone (21.81 g; 0.1 ml), biphenol A (22.8 g; 0.1 mol) and $K_2CO_3$ (15.2 g; 0.11 mol) with 100 ml of N-methyl-2-pyrolidinone (NMP) and 65 ml toluene in a 250 ml 3-necked flask (all glassware was previously flame dried). A mechanical stirrer, Dean-Stark trap (12 ml volume) with condenser and $N_2$ outlet and a Claisen adapter with $N_2$ inlet and thermocouple were attached and the entire system was purged with nitrogen for 10 minutes. The solution was heated at 155° C. for 8 hours. During this time, toluene and water collected in the Dean-Stark trap. After 8 hours, 20 ml toluene and water were allowed to drain from the trap and the temperature was raised to 180° C. After 5 hours, the toluene was drained and the temperature increased to 187° C. for 2 hours. During this time, the yellow/green solution became very viscous. The solution was cooled to room temperature, diluted with 100 ml NMP, then poured into a large excess of methanol to precipitate a fibrous white polymer which was collected and redissolved in methylene chloride. The methylene chloride solution was washed with 10% HCl and water. Methanol was then added to precipitate the polymer which was dried in a vacuum at 80° C. for 8 hours.

The results (summarized below) indicate that the ester group is incorporated along the polymer backbone. The poly(etherketone) homopolymer (no ester groups) was essentially unchanged in molecular weight whereas ester-containing polymers decreased in proportion to the amount of ester bisphenol.

TABLE 1

| BPA: Ester bisphenol | Saponification Study | | |
| --- | --- | --- | --- |
| | $M_w$ | $M_w$* | % Change |
| homopolymer | 44600 | 46100 | +3% |
| Example 1 (20:1) | 47000 | 25400 | −45% |
| Example 2 (10:1) | 34200 | 14000 | −60% |

$M_w$ - before saponification;
$M_w$* - after saponification

Example 5

Liquid Cystalline Polyester

Phenylhydroquinone (33.7 g; 0.181 mol), t-butylhydroquinone (30.0 g; 0.181 mol); chloroterephthaloylchloride (69.1 g; 0.289 mol), isophthaloyl chloride (14.7 g; 0.0722 mol) and phenylphenol (1.24 g; 0.00728 mol) were dissolved in 600 ml of phenyl ether in a 3-necked round bottom flask. An overhead stirrer, $N_2$ inlet, condenser, and $N_2$ outlet were attached and the entire system swept with dry $N_2$. The reaction was heated for 6 hours at 250° C. Upon cooling, the viscous solution was diluted with 2000 ml of $MeCl_2$ then poured into a ten fold excess of MeOH to precipitate a fibrous white polymer.

Polymer Characterization

Molecular weight as measured by GPC (polystyrene standard)

$M_w$=28900

$M_w$=12700

$M_w/M_n$=2.3

Thermal properties as measured by DSC $T_g$-131° C.; Tgi=313° C.

Cross polarization optical microscopy revealed that the polymer formed a nematic melt between 170° C. and 313° C.

Example 6

Poly(etherketone)/Liquid crystalline polyester block copolymer

The ester-containing polyetherketone prepared in Example 1 (14.0 g), the liquid crystalline polyester prepared Example 5 (3.5 g), potassium acetate (0.0088 g), and chlorobenzene (30.0 ml) were combined in a 100 ml resin kettle equipped with mechanical stirrer, $N_2$ inlet, and short path condenser. The mixture was degassed 3 times, placed under a continuous $N_2$ flow and then heated to 275° C. The chlorobenzene quickly distilled off to give a polymer melt cooled to room temperature, dissolved in methylene chloride, precipitated into methanol and then dried in vacuo at 80° C. for 8 hours.

Polymer characterization

Molecular weight as measured by GPC (polystyrene standard)

$M_w$=35000

$M_w$=12900

$M_w/M_n$=1.7

Thermal properties as measured by DSC $T_g$=147° C.

Cross polarization optical microscopy revealed that the polymer formed an isotropic melt.

Example 7

Poly(etherketone)/Liquid crystalline polyester block copolymer

The ester-containing polyetherketone prepared in Example 1 (8.75 g), the liquid crystalline polyester prepared in Example 5 (8.75 g), potassium acetate (0.0088 g), and chlorobenzene (30.0 ml) were combined in a 100 ml resin kettle equipped with mechanical stirrer, $N_2$ inlet, and short path condenser. The mixture was degassed 3 times, placed under a continuous $N_2$ flow and then heated to 275° C. The block copolymer was cooled to room temperature, dissolved in methylene chloride, precipitated into methanol and then dried in vacuo at 80° C. for 8 hours.

Polymer characterization

Thermal properties as measured by DSC $T_g$=130° C. & 147° C.

Cross polarization optical microscopy revealed that the polymer formed a birefringent melt but not a distinct nematic texture.

Example 8

Poly(etherketone)/Liquid crystalline polyester block copolymer

The ester-containing polyetherketone prepared in Example 1 (3.5 g), the liquid crystalline polyester prepared in Example 5 (14.0 g), potassium acetate (0.0088 g), and chlorobenzene (30.0 ml) were combined in a 100 ml resin kettle equipped with mechanical stirrer, $N_2$ inlet, and short path condenser. The mixture was degassed 3 times, placed under a continuous $N_2$ flow and then heated to 275° C. The chlorobenzene quickly distilled off to give a polymer melt which was stirred for a total of 3 hours at 275° C. The block polymer melt which was cooled to room temperature, dissolved in methylene chloride, precipitated into methanol and then dried in vacuo at 80° C. for 8 hours.

Polymer characterization

Molecular weight as measured by GPC (polystyrene standard)

$M_w$=28500

$M_w$=17000

$M_w/M_n$=1.7

Thermal properties as measured by DSC $T_g$'s=134° C. & 151° C.

Cross polarization optical microscopy revealed that the polymer formed a birefringent, nematic melt.

Example 9

Extraction study of block copolymers

A classic technique to differentiate blends from block copolymers is preferential solvent extraction. The poly(etherketone) used in this study (based on bisphenol A) is completely soluble in toluene whereas the liquid crystalline polyester is only slightly soluble. The block copolymers were extracted for 12 hours with toluene. If the product is a block copolymer, the percentage of product soluble should be less than the wt % poly(etherketone) in the copolymer. Covalent bonding to the liquid crystalline polyester segments should render the poly(etherketone) segments insoluble. The results are summarized in Table 1. At all compositions the % soluble is less than the wt % poly(etherketone) in the copolymer. Thus the product of the transesterification reaction is a true block copolymer and not a simple blend.

Example 10

Poly(etherketone) and Vectra Liquid Crystalline Polyester Block Copolymer

The ester-containing polyetherketone prepared in Example 1 (3.5 g), the liquid crystalline polyester sold by Hoechst-Celanese under the name Vectra (14.0 g), potassium acetate (0.0088 g), and chlorobenzene (30 ml) were combined in a 100 ml resin kettle equipped with mechanical stirrer, $N_2$ inlet, and short path condenser. The mixture was degassed 3 times, placed under a continuous $N_2$ flow and the heated to 275° C. The chlorobenzene quickly distilled off to give a polymer melt which was stirred for a total of 3 hours at 275° C. The block copolymer was cooled to room temperature, dissolved in methylene chloride, precipitated into methanol and then dried in vacuo at 80° C. for 8 hours.

The block copolymer was extracted with $MeCl_2$, which is a solvent for the poly(etherketone) but not for Vectra liquid crystalline polyester. The percent soluble was less than the total weight percent of poly(etherketone) in the block copolymer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A block copolymer represented by the formula:

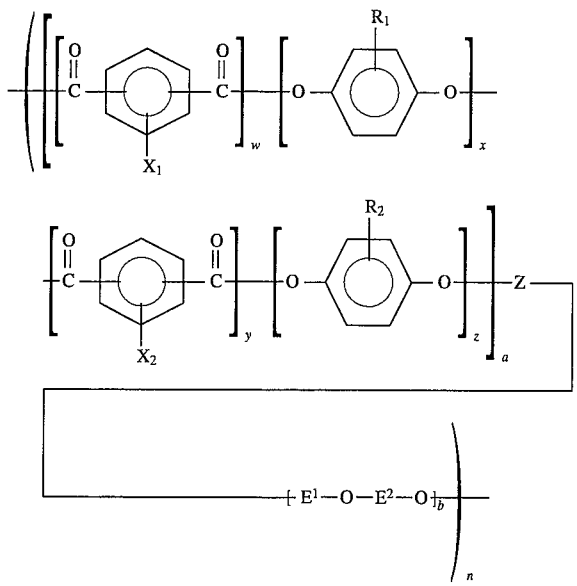

in which $R_1$ and $R_2$ each represents an alkyl group, aryl group, aralkyl group, alkoxy group, phenoxy group or a combination of these groups;

$X_1$ and $X_2$ each represents a hydrogen or halogen atom;

w, x, y, z each represents a mole fraction of the monomer residuum such that (w+y)=(x+z);

Z represents the linkage which results from the transesterification of a liquid crystalline polyester and an ester group containing aromatic polyether;

$E^1$ represents the residuum of a benzenoid compound having an electron withdrawing group in at least one of the positions ortho or para to the valence bonds having a sigma value sufficient to activate a halogen enough to promote reaction of the halogen with an alkali metal phenolate, $E^2$ represents the residuum of a dihydric phenol which does not contain ester groups, a represents the average number of repeated aryl ester units in the block copolymer;

b represents the average number of repeated aryl ether units in the block copolymer; and n represents the degree of polymerization of the block copolymer.

2. The block copolymer of claim 1 in which $X_1$ and $X_2$ each represents a chlorine atom;

w represents a mole fraction of from 0.01 to 0.99;

x represents a mole fraction of from 0.01 to 0.99;

y represents a mole fraction of from 00.01 to 0.99; and z represents a mole fraction of from 0.01 to 0.99.

3. The block copolymer of claim 2 in which a represents a number from 2 to 50;

b represents a number from 2 to 50;

n represents a number from 2 to 50.

4. The block copolymer of claim 1 in which a represents a number from 2 to 200;

b represents a number from 2 to 200; and n represents a number from 2 to 50.

5. The block copolymer of claim 1 in which w represents a mole fraction of about 0.20 x represents a mole fraction of about 0.50;

y represents a mole fraction of about 0.80; and z represents a mole fraction of about 0.50.

6. The block copolymer of claim 1 represented by the formula:

in which Z represents the group:

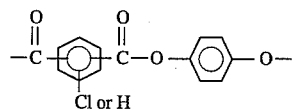

or

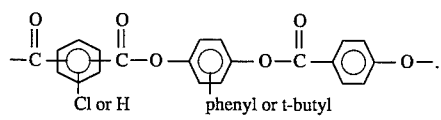

7. The block copolymer of claim 1 represented by the general formula:

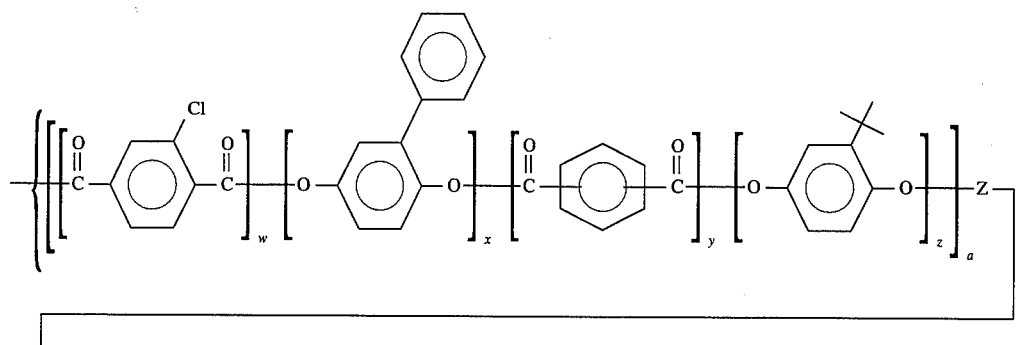

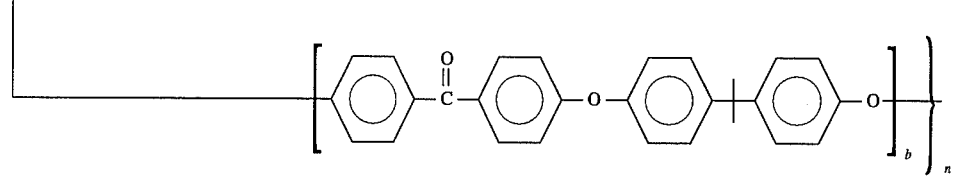

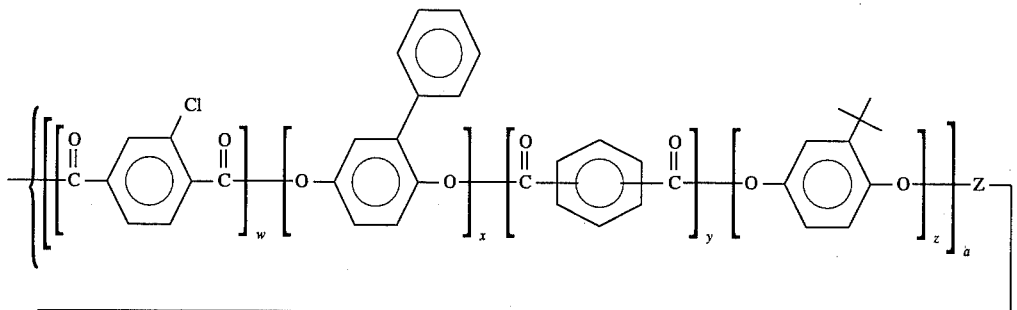

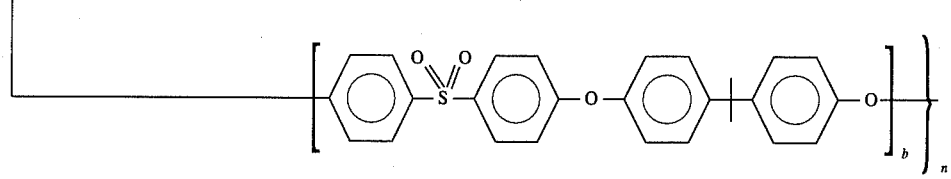

in which Z represents

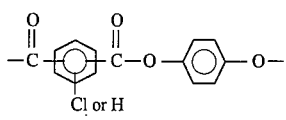
Cl or H or

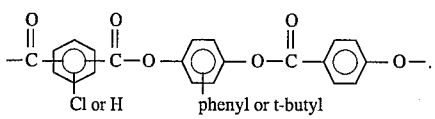
Cl or H    phenyl or t-butyl

8. A process for the production of the copolymer represented by the formula

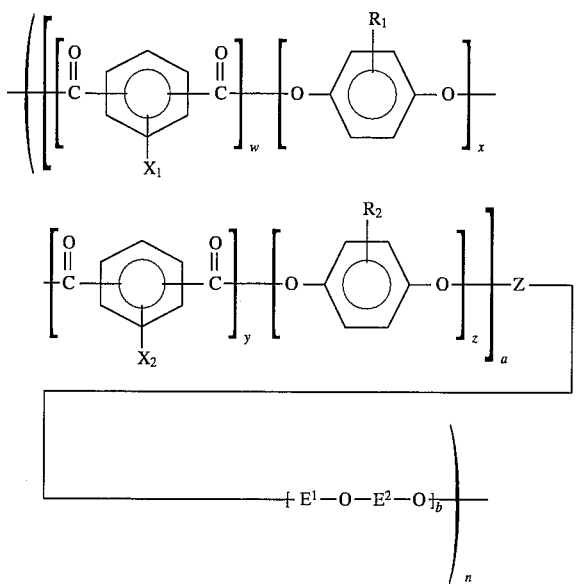

in which

R$_1$ and R$_2$ each represents an alkyl group, aryl group, aralkyl group, alkoxy group, phenoxy group or a combination of these groups;

X$_1$ and X$_2$ each represents a hydrogen or halogen atom;

w,x,y and z each represents a mole fraction of the monomer residuum such that (w+y)=(x+z);

Z represents the linkage which results from the transesterification of a liquid crystalline polyester and an ester group containing aromatic polyether;

E$^1$ represents the residuum of a benzenoid compound having an electron withdrawing group in at least one of the positions ortho or para to the valence bonds having a sigma value sufficient to activate a halogen enough to promote reaction of the halogen with an alkali metal phenolate;

E$^2$ represents the residuum of a dihydric phenol which does not contain ester groups;

a represents the average number of repeated aryl ester units in the block copolymer;

b represents the average number of repeated aryl ether units in the block copolymer; and n represents the degree of polymerization of the block copolymer in which an ester containing poly(aryl ether ketone) composed of recurring units represented by the formula

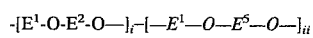

in which

E$^5$ represents the residuum of an ester group containing bisphenol; and i and ii each represents an integer such that the sum of i plus ii totals 100, provided that ii is greater than 0 is contacted with a liquid crystalline polyester represented by the formula

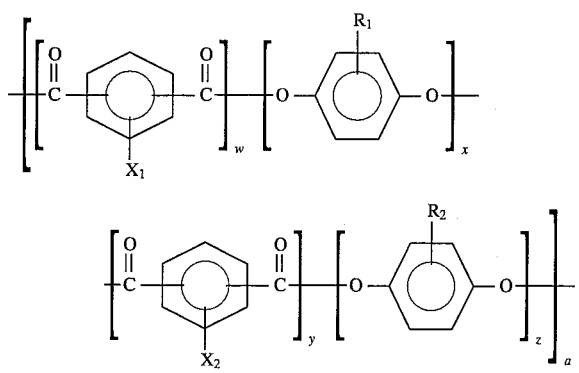

under conditions such that a transesterification reaction occurs to form the desired copolymer.

9. The process of claim 8 in which

R$_1$ and R$_2$ each represents a t-butyl or phenyl group;

X$_1$ and X$_2$ each represents hydrogen or chlorine;

w represents a mole fraction of about 0.20;

x represents a mole fraction of about 0.50;

y represents a mole fraction of about 0.80; and z represents a mole fraction of about 0.50;

under conditions such that a transesterification reaction occurs to form the copolymer.

10. The process of claim 8 in which the poly(aryl ether ketone) and the liquid crystalline polyester are contacted in the presence of a transesterification catalyst.

11. The process of claim 8 in which the poly(aryl ether ketone) and liquid crystalline polyester are contacted at a temperature of from about 150° to about 400° C.

12. The process of claim 8 in which the poly(aryl ether ketone) and liquid crystalline polyester are contacted in the presence of a solvent having a boiling point below about 400° C.

* * * * *